(12) United States Patent
Luther et al.

(10) Patent No.: US 7,394,979 B2
(45) Date of Patent: Jul. 1, 2008

(54) CAMERA ADAPTER FOR OPTICAL DEVICES, IN PARTICULAR MICROSCOPES

(75) Inventors: Egon Luther, Cospeda (DE); Ingo Koschmieder, Jena (DE); Jan Buchheister, Jena (DE); Eberhard Hofmann, Bollberg (DE); Mario Gerlach, Altenberga (DE); Stephan Ruehling, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 222 days.

(21) Appl. No.: 10/526,583

(22) PCT Filed: Jul. 18, 2003

(86) PCT No.: PCT/EP03/07876

§ 371 (c)(1),
(2), (4) Date: Sep. 9, 2005

(87) PCT Pub. No.: WO2004/023185

PCT Pub. Date: Mar. 18, 2004

(65) Prior Publication Data

US 2006/0077535 A1    Apr. 13, 2006

(30) Foreign Application Priority Data

Sep. 4, 2002    (DE) ................................ 102 40 720

(51) Int. Cl.
G02B 21/36    (2006.01)
G02B 21/00    (2006.01)
G02B 21/22    (2006.01)
H04N 7/18    (2006.01)
H04N 9/47    (2006.01)

(52) U.S. Cl. ....................... 396/432; 359/368; 359/372; 348/79

(58) Field of Classification Search .................. 396/429, 396/432; 359/363, 381, 367–369, 372; 348/79; 350/255

See application file for complete search history.

(56) References Cited

U.S. PATENT DOCUMENTS 3,900,021 A    8/1975    Makepeace et al. ............ 128/4
4,856,872 A *  8/1989    Spitznas et al. ............. 359/826

(Continued)

FOREIGN PATENT DOCUMENTS

DE    44 02 157    2/1996

(Continued)

*Primary Examiner*—Melissa Jan Koval
(74) *Attorney, Agent, or Firm*—Reed Smith LLP

(57) ABSTRACT

A camera adapter for optical devices, in particular microscopes. The present solution includes a camera adapter which enables any video cameras and photographic cameras to connect to an existing image out-coupling system, e.g., the beam splitter of a microscope. The adapter can also be used for stereo microscopes. The camera adapter is arranged between the image out-coupling element and the camera. Its housing has two connection pieces. The microscope-side connection piece has a quick-change device and the camera-side connection piece has a filter thread. The technical solution provides a camera adapter for connecting digital cameras to a microscope. By using intermediate rings, the camera adapter is suitable for different cameras and facilitates exchange of cameras. The camera can be positioned in such a way that the observer can view the object through the eyepiece as well as on the camera monitor without substantially changing his/her sitting position.

4 Claims, 3 Drawing Sheets

U.S. PATENT DOCUMENTS

| | | | |
|---|---|---|---|
| 4,862,199 A | 8/1989 | Centlowski et al. | 354/62 |
| 5,006,872 A | 4/1991 | Parker | 354/79 |
| 5,053,794 A | 10/1991 | Benz | 354/79 |
| 5,134,515 A | 7/1992 | Papritz et al. | 359/223 |
| 5,568,188 A | 10/1996 | Widmer et al. | 348/79 |
| 5,652,676 A | 7/1997 | Grinblat | 359/363 |
| 6,147,797 A * | 11/2000 | Lee | 359/363 |
| 6,327,078 B1 | 12/2001 | Lee | 359/363 |
| 2002/0197075 A1 * | 12/2002 | Crockett | 396/429 |

FOREIGN PATENT DOCUMENTS

| | | |
|---|---|---|
| DE | 38 04 198 | 8/1998 |
| DE | 199 38 466 | 2/2000 |
| DE | 200 10 241 | 11/2000 |
| EP | 0 274 038 | 7/1988 |
| FR | 2 793 567 | 11/2000 |

* cited by examiner

CAMERA ADAPTER FOR OPTICAL DEVICES, IN PARTICULAR MICROSCOPES

CROSS-REFERENCE TO RELATED APPLICATIONS

This application claims priority of International Application No. PCT/EP03/07876, filed Jul. 18, 2003, and German Application No. 102 40 720.7, filed Sep. 4, 2002, the complete disclosures of which are hereby incorporated by reference.

BACKGROUND OF THE INVENTION a) Field of the Invention

The present technical solution is directed to a camera adapter which makes it possible to connect any video cameras and photographic cameras to an existing image out-coupling system, e.g., the beam splitter of a microscope. The adapter can also be used for stereo microscopes and in particular for ophthalmic microscopes.

b) Description of the Related Art

According to the known prior art, lensless cameras are connected to a special optical output at the microscope or stereomicroscope by a corresponding coupling in order to document microscopic images. T2, C-mount or various bayonet connections, for example, are usually used as coupling systems. The image information for this special camera output is generated by splitting the optical beam path or stereo beam path and is imaged on the corresponding recording medium by imaging optics. In the solution described in U.S. Pat. No. 5,652,676, the adapter pertains to a motor-driven zoom objective and has a ring to which video cameras or photographic camera can be connected by a C mount or bayonet connection. However, since these cameras are usually specific solutions exclusively in technical fields, the search for other solutions was intensified.

Cameras that are arranged at the eyepiece connection piece or at the eyepiece of the optical device represent another possibility for image generation. A solution of this kind is described in EP 0 274 038, in which the tube image of a slit lamp or of a microscope is imaged on a recording medium by a special adapter and the camera objective. U.S. Pat. No. 5,053,794 describes an adapter ring which is suitable, for example, to connect a photographic camera or video camera to the eyepiece of a telescope or microscope. While "normal" mirror reflex cameras can be used in these solutions, it is disadvantageous that binocular observation is not possible when the camera is connected.

An adapter for connecting a camera to a phototube of a microscope is described in Utility Model Application DE 200 10 421 U1. The adapter has a lens system and a retaining clip. The intermediate image generated in the microscope is infinity-imaged by the lens system and projected onto the recording medium of the connected camera by the objective of the camera. The retaining clip is fastened to the phototube of the microscope and has a fastening screw which engages in the stand thread provided at the camera and thereby fixes the camera. Since there is no uniform standard for the distance of the stand thread from the optical axis or for the arrangement of the stand thread at the camera housing, these dimensions vary quite a lot in different cameras. The described adapter is accordingly only usable for particular cameras and must be adapted for other cameras.

A video attachment for a microscope without a phototube is described in U.S. Pat. No. 5,568,188. The video attachment is connected to the microscope by connection elements. The alignment of the video attachment with respect to the optical axis of the microscope is carried out by means of screws that are provided. The adjusted position of the video attachment is fixed by means of springs and retaining screws. The optical axis of the video attachment encloses an angle with the optical axis of the microscope so that the images seen by the two elements are not the same. Accordingly, it is not possible for the image seen in the microscope to be recorded at the same time by the video camera. The adjustments at the microscope must be changed for video documentation. Therefore, it can be ensured only with difficulty that the video recording is the same as the images of the examined eye that the observer saw previously. Further, this "double" examination takes substantially more time and is therefore more stressful for the patient.

U.S. Pat. No. 5,134,515 concerns a photographic attachment and a shutter arrangement for a binocular microscope, particularly an ophthalmic microscope. The photographic attachment is arranged in the observation beam path between the magnification changer and the eyepiece tube. This photographic attachment has a movable mirror which swivels into the observation beam path when actuated and deflects the latter in direction of the provided phototube and the photo camera connected to it. When actuated, the shutter adjustment for the photographic recordings changes at the same time. After a slight delay in time, the shutter release of the camera and the provided flash are actuated and a recording of the eye is made. After this, all of the moving parts return to their original positions either by spring force or gravitational force. This frees the observation beam path again so that it is possible to resume observation through the eyepiece. Miniature-format cameras and instant-image cameras can be used by adding different objective tubes. However, the photographic attachment is not suitable for recording video sequences. Further, it is disadvantageous that no observation is possible while photographic recordings are being made.

It is the primary object of the present technical solution to develop an adapter for connecting a camera, preferably a digital camera, to a microscope, particularly an ophthalmic microscope. The adapter is equally suitable for different cameras and allows cameras to be exchanged in a simple manner. The camera can be arranged in such a way that the observer can see the object through the microscope eyepiece as well as on the monitor located on the back of the camera housing without having to change sitting positions.

This object is met by a camera adapter for optical devices, such as microscopes, having an additional image out-coupling element for photographic documentation of images. The camera adapter is to be arranged between the image out-coupling element and a camera. The camera adapter comprises a housing with two connection pieces, a microscope-side connection piece and a camera-side connection piece. The microscope-side connection piece has a quick-change device. The camera-side connection piece has a filter thread and eyepiece optics.

The technical solution will be described in the following with reference to an embodiment example.

DESCRIPTION OF THE PREFERRED

EMBODIMENTS

Figure 1:
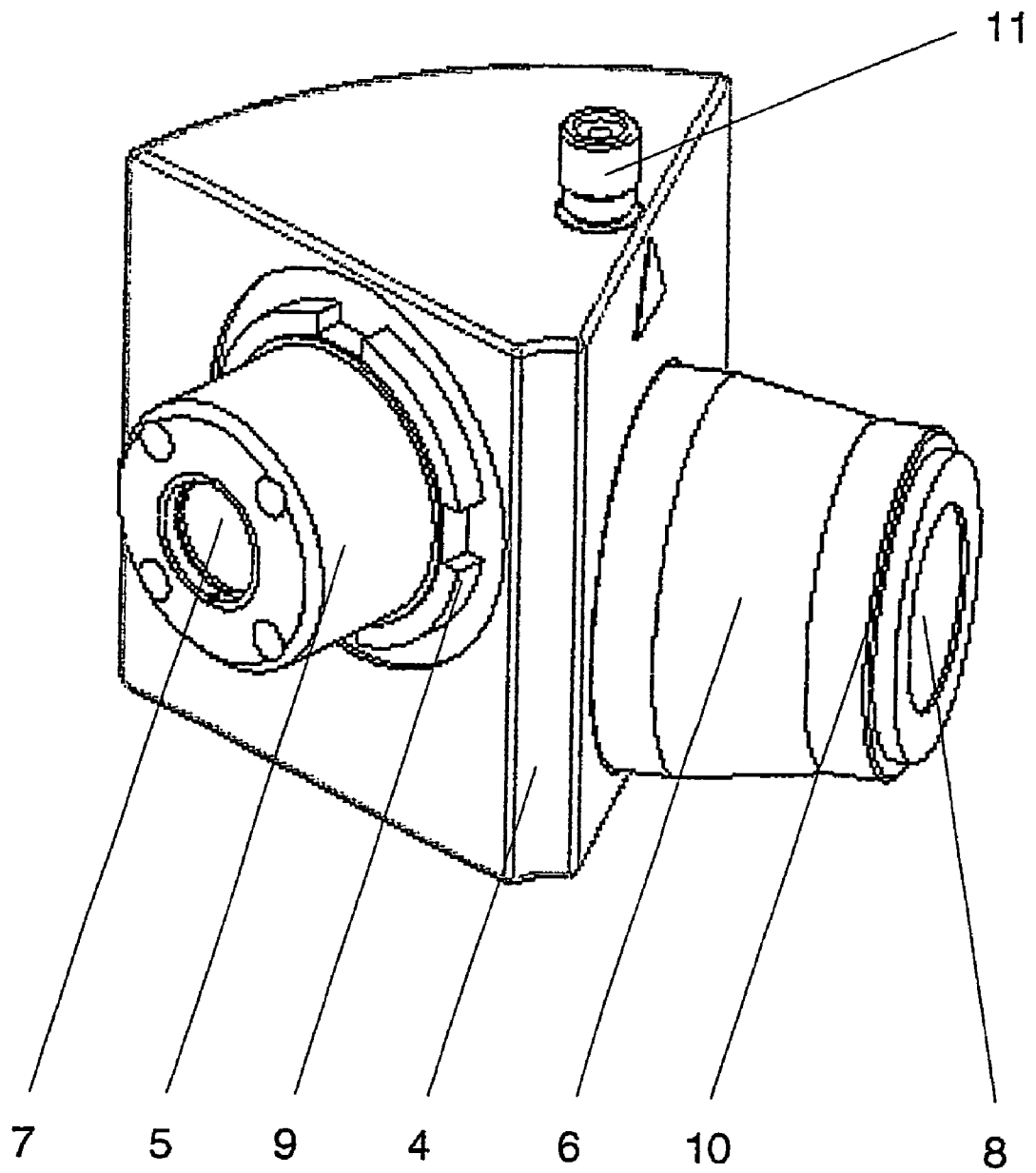
FIG. 1 shows the basic construction of the camera adapter according to the invention.

FIG. 1 shows the camera adapter for optical devices, particularly an ophthalmic microscope 1. An additional image out-coupling element 2, such as a swivel mirror or beam splitter, and a surrounding-field illuminator 3 for illuminating the object field when using slit projectors are required for photographic documentation of images in devices of the type mentioned above. The camera adapter to be arranged between the image out-coupling element 2 and the camera comprises a housing 4 with two connection pieces 5 and 6. The microscope-side connection piece 5 preferably has a quick-change device 9 such as is known from other microscope accessory units and has tube optics 7. The camera adapter is positively centered by this quick-change device 9 so that the optical axis of the camera coincides with that of the microscope 1 or of an optical channel of a stereo microscope.

In contrast, the camera-side connection piece 6 has a filter thread 10 and has eyepiece optics 8. The filter thread 10 is preferably M37 and can be adapted to different diameters of filter threads 10 or objective cylinders by using intermediate rings 12.

Commercially available digital cameras with an objective, filter thread and preferably also with a monitor on the back of the housing are used. The camera-side connection piece 6 is rotatable in the housing 4 so that the camera, which is sometimes seated obliquely at the filter thread 10, can be brought into a straight position together with the connection piece 6. The connection piece 6 is prevented from turning again by means of a securing device 11. The camera adapter is advantageously constructed over a combined prism/mirror arrangement so as to allow ergonomic viewing of the monitor located at the back of the camera and customary operation.

The surrounding-field illuminator 3 which may possibly be required for photographic documentation comprises a light-emitting diode which emits white light in special cases. Its brightness can be regulated by a dimmer 13 and can be adapted to different illumination conditions so as to ensure that the slit image will be displayed in an optimal manner on a favorably illuminated surrounding field (eye). Power is supplied by means of the power supply of the microscope 1. The surrounding-field illuminator 3 can have an attachment plug that fits into an opening provided at the microscope 1. The surrounding-field illuminator 3 is switched on when slit recordings are made in darkened rooms and the location of the slit image is to be displayed on the eye.

In a particular construction, the LED is based, for example, on a high-performance blue LED with a wavelength of 450 nm that excites light emission in a special layer at around 550 nm. The illumination maxima give a bluish-white, very intensive light. Accordingly, the light source can also be used as an excitation light for fluorescence examinations, i.e., for diagnosing with contrast media or fluorescence media.

Figure 2:
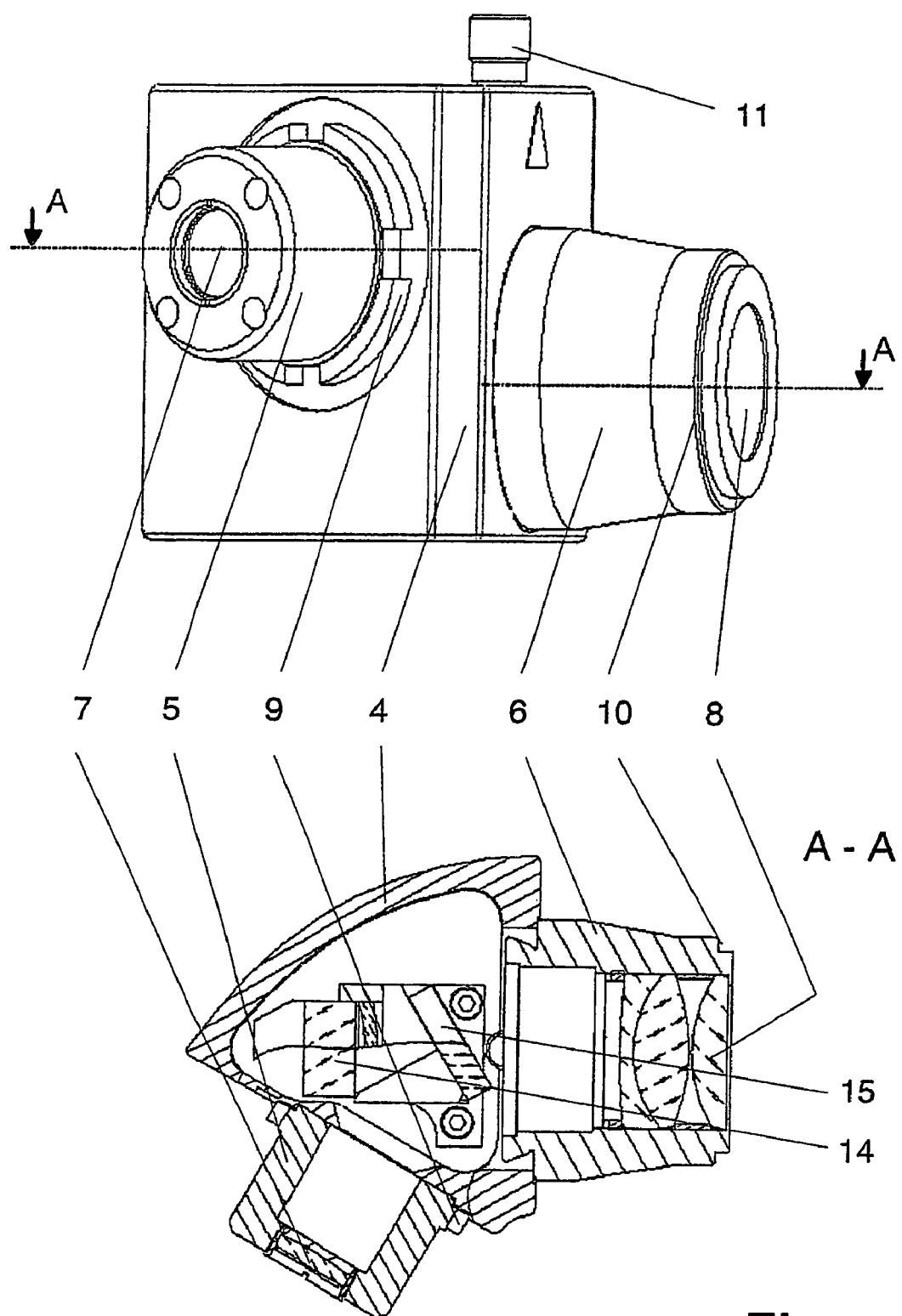
FIG. 2 shows the camera adapter in section A-A.
Figure 3:
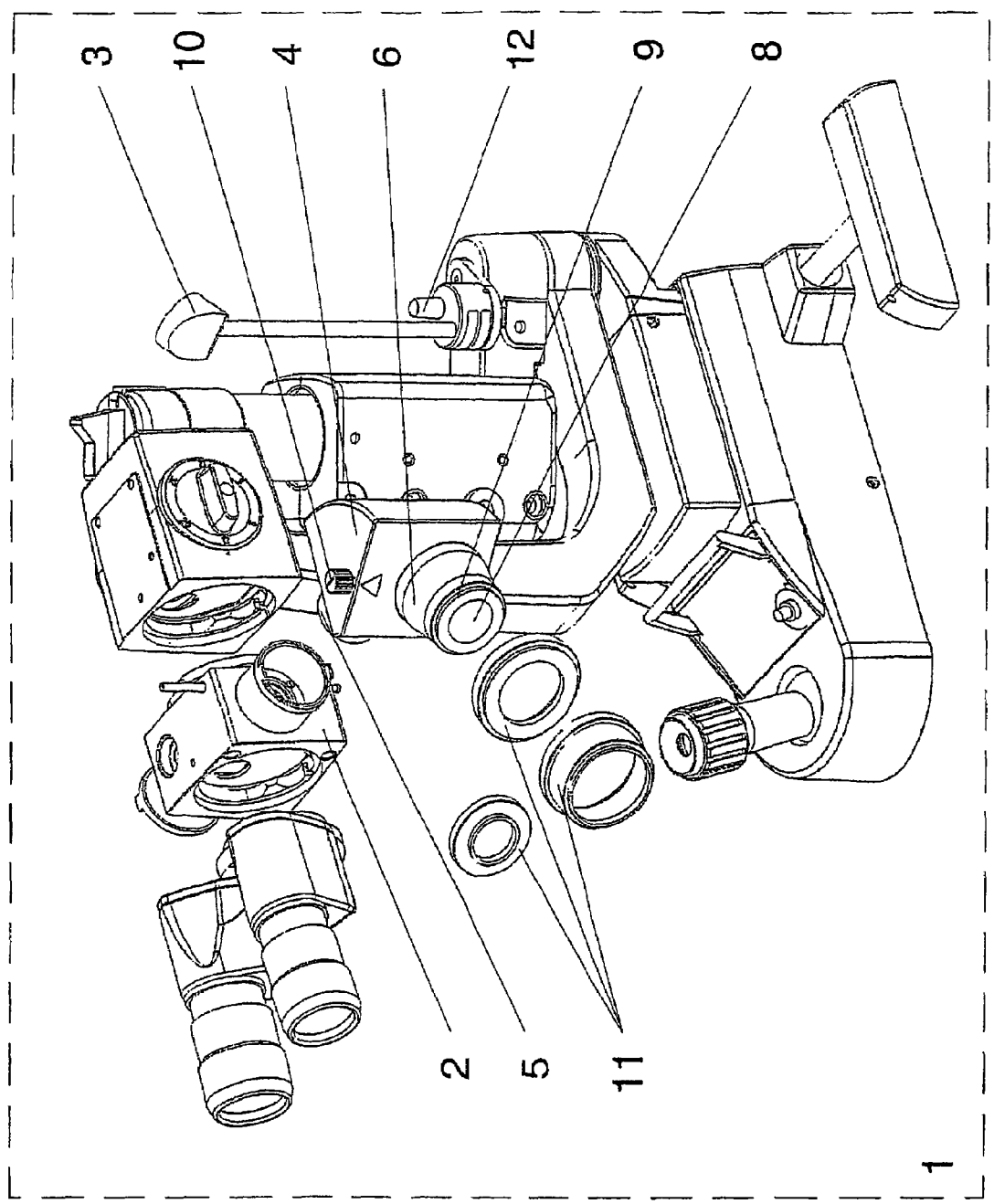
FIG. 3 shows the use of the camera adapter on a microscope.

A right-angle prism 14 and a mirror 15 are arranged in the housing 4 of the camera adapter as additional beam-deflecting elements in such a way that the optical axes of the connection pieces 5 and 6 enclose an angle of less than 180°. In this connection, FIG. 2 shows the camera adapter in a sectional view. An angle of 120°, for example, is enclosed in order to bring the camera into a favorable ergonomic position for the observer. Further, the additional beam-deflecting elements result in different heights of the connection pieces 5 and 6 so that the favorable ergonomic arrangement is further improved. Also, the straight-line reflection generates a right-way-round, noninverted image for the camera that is to be attached. The use of the camera adapter in an ophthalmic microscope is shown in FIG. 3.

The technical solution provides a camera adapter for connecting digital cameras, preferably having a monitor at the back of the housing, to a microscope, particularly an ophthalmic microscope. By using intermediate rings, the camera adapter is suitable for different cameras having a filter thread and facilitates exchange of cameras. The camera can always be positioned in such a way that the observer can view the object through the eyepiece as well as on the camera monitor without substantially changing his/her sitting position.

The use of a surrounding-field illuminator with a controllable LED has a constant spectrum at all brightness settings, offers sufficient reserve power for difficult illumination conditions, and generates a very small cornea reflection. The higher, constant color temperature, e.g., of a white-light LED, in connection with the slit illumination results in high-contrast slit recordings. The surrounding-field illuminator has a very simple construction, a long useful life and reliability and can easily be connected to the power supply of the microscope.

While the foregoing description and drawings represent the present invention, it will be obvious to those skilled in the art that various changes may be made therein without departing from the true spirit and scope of the present invention.

REFERENCE NUMBERS 1 microscope
2 image out-coupling element
3 surrounding-field illuminator
4 housing
5 microscope-side connection piece
6 camera-side connection piece
7 tube optics
8 eyepiece optics
9 filter thread
10 securing device
11 intermediate rings
12 dimmer
13 prism
14 mirror

The invention claimed is:

1. A camera adapter for optical devices, such as microscopes, having an additional image out-coupling element for photographic documentation of images;
   said camera adapter to be arranged between the image out-coupling element and a camera and comprising:
   a housing with two connection pieces, a microscope-side connection piece and a camera-side connection piece;
   said microscope-side connection piece having a quick-change device;
   said camera-side connection piece having a filter thread and eyepiece optics; and
   wherein the microscope-side connection piece has tube optics.

2. The camera adapter according to claim 1, wherein the camera-side connection piece is rotatable and has a securing device, wherein its filter thread is an M37 thread, and wherein this filter thread can be adapted to different thread diameters by intermediate rings.

3. The camera adapter according to claim 1, wherein a right-angle prism and a deflecting mirror are provided as additional beam-deflecting elements.

4. A camera adapter according to claim 1, wherein a surrounding-field illuminator is provided in addition, wherein this surrounding-field illuminator has a light-emitting diode, and wherein the light-emitting diode emits white light, can be controlled with respect to brightness and powered by the power supply of the microscope.

* * * * *